July 31, 1962  W. DZUS  3,046,828
STUD HAVING OVERHANGING RE-ENTRANT LOAD BEARING THREADS
AND A SHEET METAL NUT WITH RESILIENT
HELICALLY INCLINED WINGS
Filed April 17, 1958
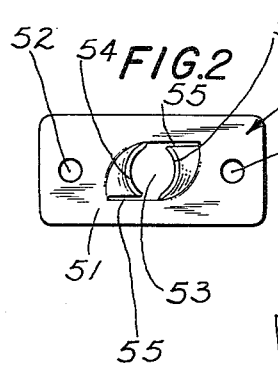
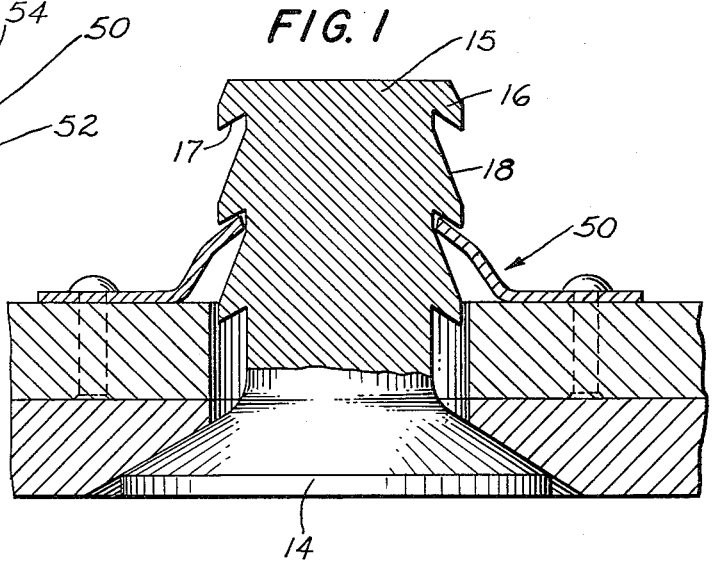
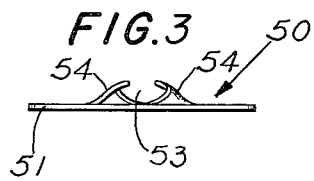
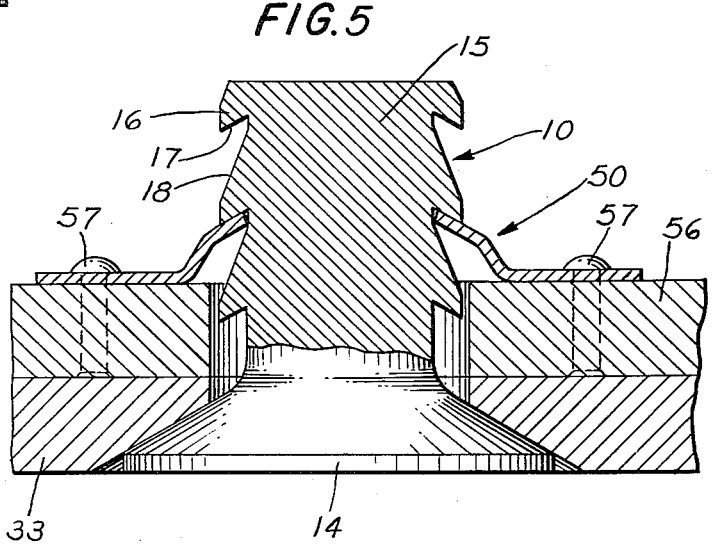
INVENTOR
*WILLIAM DZUS*
BY
*Daniel H Kane*
ATTORNEYS United States Patent Office 3,046,828
Patented July 31, 1962

3,046,828
STUD HAVING OVERHANGING RE-ENTRANT LOAD BEARING THREADS AND A SHEET METAL NUT WITH RESILIENT HELICALLY INCLINED WINGS
William Dzus, West Islip, N.Y.
(% Dzus Fastener Co., Inc., Babylon, Long Island, N.Y.)
Filed Apr. 17, 1958, Ser. No. 728,959
1 Claim. (Cl. 85—36)

This invention relates to improved threaded fastening devices and more particularly to an improved screw thread for such devices.

My invention is particularly applicable to threaded fastening devices consisting of a male screw member having an external helical thread such as a screw or bolt and a complementary female screw member. The two members are interengageable and releasable upon relative rotation of one member with respect to the other.

The threads used in fastening devices of this type have had recognized disadvantages. Thus where high loads, particularly tension loads, are applied to such fastening devices the threads heretofore used exerted a wedging action upon the nut or receptacle causing it to spread so as to release the interengagement between the male and female members. Because of this condition, the ultimate strength of the fastening device, particularly in tension, is frequently determined by this wedging or spreading action caused by the threads rather than by the ultimate strength of the materials from which the members are made.

It is a particular object of the present invention to overcome the difficulties encountered in this respect and to provide an improved thread for fastening devices of this type which will not cause spreading of the nut or receptacle when loads are applied to the fastening device but on the contrary will cause a compressive action upon the nut or receptacle causing it to tightly grip the stud or bolt augmenting the engagement between the threads and causing them to reinforce each other and thereby increasing the strength of the fastening device.

A further object is the provision of an improved screw thread design for fastening devices which is applicable to threads of varying pitch and which may be readily applied to any type of interengageable threaded fastening device.

My invention contemplates the provision of an improved fastening device having interengageable members with complementary threads formed with load carrying side walls presenting interengaging, overhanging, concave or re-entrant surfaces. The re-entrant surfaces of the side walls of the threads exert a camming compressive action causing the female fastening member to tightly engage the male fastening member.

Referring to the accompanying drawings:

FIG. 1 is a longitudinal sectional view (with the head of the stud shown in full line) of a stud member assembled with a receptacle member;

FIG. 2 is a top plan view of the receptacle member;

FIG. 3 is a side elevational view of the receptacle member;

FIG. 4 is an end elevational view thereof; and,

FIG. 5 is a view similar to FIG. 1 showing the stud member completely assembled with the receptacle member.

My invention is applicable to a fastener assembly in which the stud member has a thread embodying my invention which engages with a sheet metal type of clip. Thus in FIGS. 1–5 I have shown a fastener assembly of this type comprising a stud 10 which is engageable with a receptacle 50 made of resilient sheet metal stock. The stud has a head portion 14 with a shank portion 15 projecting therefrom and formed with a double lead external helical thread 16 extending therearound.

The thread is provided with a load bearing side wall 17 of my improved design presenting an overhanging, inturned, re-entrant surface. In an assembly of this type the principal loads are exerted in tension therefore the side wall 17 facing towards the head of the stud is the load bearing surface. The opposite wall 18 may be of conventional tapered design.

The receptacle member 50 is in the form of a clip made of resilient sheet metal stock. The clip has a base portion 51 which rests against the surface to which it is to be attached and is preferably provided with apertures 52 for receiving rivets for holding it in place. The central portion of the clip is provided with an aperture 53 of a size to receive the shank of the stud. Surrounding the aperture 53 are a plurality (preferably two) of resilient members 54 in the form of wings or arms struck upwardly from the base portion of the clip. For this purpose each of the resilient members is separated at one end from the base of the clip by a longitudinal slot 55 at the trailing end of the resilient members in the direction of rotation of the stud when it is tightened. Each of the resilient members is bent upwardly at an angle so as to form a thread portion which is engageable with the threads of the stud. In this connection the pitch or angle of the resilient members is slightly greater than the pitch or angle of the threads of the stud whereby the clip serves a self-locking function when the stud is tightened in the manner shown in FIG. 5.

In assembling the fastener the clip 50 may be attached to a plate or other member 56 by means of rivets 57. The plate 56 has a central aperture in alignment with the aperture 53 in the clip.

The stud 10 in turn is assembled with a plate 33 and the shank portion is inserted through the aperture in plate 56 and the thread is engaged with the edges of the resilient members 54 which serve as mating threads. When the stud is rotated in a clockwise direction it is tightened and when it is rotated in a counterclockwise direction it is loosened.

As previously pointed out the pitch of the resilient members 54 is slightly greater than the pitch of the threads 16. Accordingly when the stud is only partially tightened the threads of the stud will only engage with the trailing ends of the resilient members in the direction of rotation of the stud while it is being tightened and the relationship between the stud threads and the resilient members will be as indicated in FIG. 1. When the stud is further tightened by rotating in a clockwise direction the trailing ends of the resilient members are forced downwardly by the camming action of the threads and at the same time the resilient members are drawn slightly inwardly until they fully engage the undersurface of the thread and the base or root thereof as shown in FIG. 5. This imparts added strength to the assembly and at the same time the resilient, frictional engagement between the parts performs a self-locking function. Accordingly the assembly will not be accidently loosened by vibration. To open the fastener device the stud is simply rotated in a counterclockwise direction.

From the foregoing description of my invention it will seem that I have provided an improved threaded fastener assembly having an improved thread with a load carrying side wall surface causing a camming action which urges the receptacle into engagement with the stud and which causes the threads of the stud and the receptacle to reinforce each other.

I claim:

A threaded fastening device comprising a stud member having a cylindrical shank with an external helical thread and a cooperating receptacle member in the form of a clip made of relatively resilient sheet metal and having an opening of a size to receive the shank of the stud with a plurality of integral resilient wings surrounding the opening and contractible towards and expandable away from each other and being engageable with the external thread of the stud when the stud and receptacle are rotated relative to each other, said external thread on the stud having a side wall presenting a load bearing surface which in a direction diametrically of said shank is disposed at an overhanging, re-entrant angle and said stud being formed with a cylindrical root portion immediately adjacent said re-entrant, load bearing surface and each of said wings having its leading end formed integrally with and directly connected to said sheet metal clip at the edge of said opening and its trailing end spaced above and separated from said sheet metal clip and separated therefrom by a slot and said wings in a direction diametrically of said shank being disposed at an angle generally complementary but greater than the angle of the overhanging, re-entrant, load bearing surface and being also disposed at an angle circularly in the direction of rotation generally complementary to but greater than the pitch of the thread and being directly engageable with the load bearing surface so that the overhanging, re-entrant, load bearing surface exerts a wedging, contracting force thereon when the parts are stressed in tension to bring the one surface of the wings into direct contacting engagement with the load bearing surface of the stud thread and generally parallel thereto and the inner edges of the wings into direct contact with the root portion of the stud thereby reinforcing the parts and so as to cause a self-locking action.

References Cited in the file of this patent

UNITED STATES PATENTS

| | | |
|---|---|---|
| 197,466 | Harvey | Nov. 27, 1877 |
| 781,571 | Thomas | Jan. 31, 1905 |
| 2,207,005 | Haas | July 9, 1940 |
| 2,221,498 | Tinnerman | Nov. 12, 1940 |
| 2,379,892 | Eggert | July 10, 1945 |
| 2,398,827 | Graham et al. | Apr. 23, 1946 |

FOREIGN PATENTS

| | | |
|---|---|---|
| 137,777 | Great Britain | Jan. 22, 1920 |
| 668,686 | Great Britain | Mar. 19, 1952 |